Jan. 10, 1956     E. S. DUNN     2,730,636

FLUID TIGHT SEAL FOR ELECTRIC MOTORS AND GENERATORS

Filed Sept. 27, 1954

INVENTOR.
EUSTACE S. DUNN
BY Henry Gifford Hardy.
Attorney.

United States Patent Office 2,730,636
Patented Jan. 10, 1956

2,730,636

FLUIDTIGHT SEAL FOR ELECTRIC MOTORS AND GENERATORS

Eustace S. Dunn, Piedmont, Calif.

Application September 27, 1954, Serial No. 458,356

2 Claims. (Cl. 310—86)

This invention relates to electric motors of the type in which the stator and windings are sealed for protection against the action of the fluid or the atmosphere in which the motor is operated. Motors of this type are used, for example, in submersible pumps, which are, in effect, turbine pumps with a close-coupled electric motor, both pump and motor being immersed in the water, oil, or other fluid to be pumped.

In the construction of motors of the aforementioned type it is preferred practice to enclose the stator and the stator windings in a protective cylindrical housing and to seal the bore of the stator, within which the rotor is mounted, by means of a tubular lining sleeve so that fluid cannot enter the slots containing the windings.

The sleeve may be of a nonmagnetic material of high electrical resistance, such as stainless steel. Since the efficiency of the motor decreases as the thickness of the sleeve wall increases it should be as thin-walled as mechanical considerations will allow. Among such considerations are the static pressure that the sleeve must sustain when the motor is operated at great depths, and the necessity of installing the sleeve without deformation or damage as a tight press fit within the stator bore so that it will not turn under the influence of the continuous vibration and constant changes of temperature that occur when the motor is operated.

The enclosure within which the stator and windings are sealed is completely by annular end pieces joined to the protective cylindrical housing and the lining sleeve by water tight joints. It has been preferred practice for the joint between the annular end pieces and the lining sleeve to be soldered or brazed. Both these methods involve a high degree of skill owing to the thinness of the lining sleeve wall. The uncertainty of the resulting watertightness necessitates costly testing and inspection of each unit before the result is known to be satisfactory.

Within the bore of the lining sleeve a rotor is mounted having a small clearance from the bore. The shaft of the rotor rotates in bearings which it has been preferred practice to mount in a second pair of rings secured to the protective cylindrical housing of the motor.

To mount the rotor in this manner, while insuring its accurate concentricity with the bore of the lining sleeve, necessitates costly and accurate machining, since any inaccuracy produces unbalanced loads on the rotor whereby the rotor may actually touch the lining sleeve.

This invention makes possible the use of rubber rings as a sealing device for the watertight joint between the lining sleeve and the annular end pieces at the same time permitting the mounting of the shaft bearings directly into the lining sleeve bore, by which the concentricity of the rotor within the bore can be assured.

The invention so interconnects the rubber sealing rings with the shaft bearings as to produce extreme compression in the rubber rings and at the same time automatically locks the shaft bearing securely against rotary and longitudinal movement.

The various objects, features and advantages of this invention will appear more fully from the detailed description which follows, accompanied by drawings showing, for the purpose of illustration, a preferred embodiment of the invention. The invention also consists in certain new and original features of construction and combination of elements hereinafter set forth and claimed.

Although the characteristic features of the invention which are believed to be novel will be particularly pointed out in the claims appended hereto, the invention itself, its objects and advantages, and the manner in which it may be carried out may be better understood by referring to the following description taken in connection with the accompanying drawings forming a part of it in which:

Figure 1:
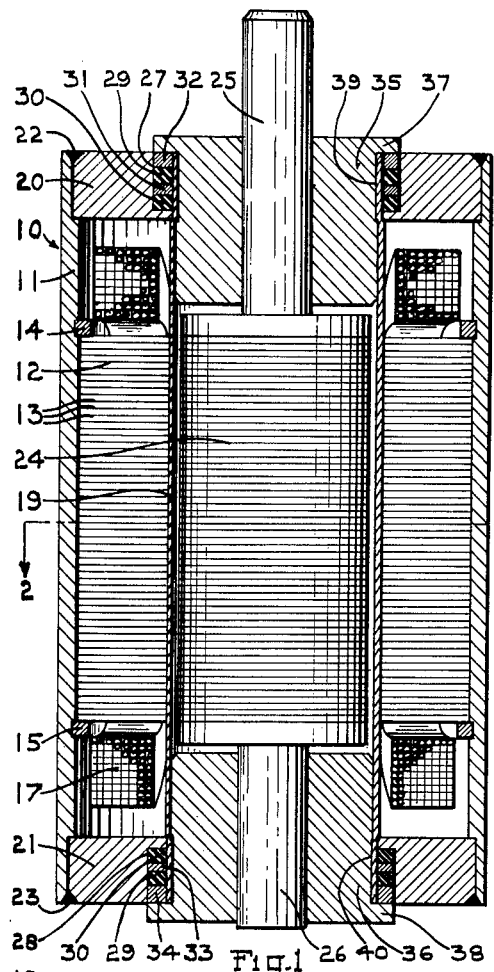
Figure 1 is a vertical section, with the rotor shown in elevation, showing the essential elements of a motor incorporating the invention, the section being taken on the line 1—1 of Figure 2.

In the following description and in the claims, various details will be identified by specific names for convenience. These names, however, are intended to be as generic in their application as the art will permit. Corresponding reference characters refer to corresponding parts in the several figures of the drawings.

In the drawings accompanying, and forming part of the specifications, certain specific disclosure of the invention is made for the purpose of explanation of broader aspects of the invention, but it is understood that the details may be modified in various respects without departure from the principles of the invention and that the invention may be applied to other structures than the one shown.

Figure 2:
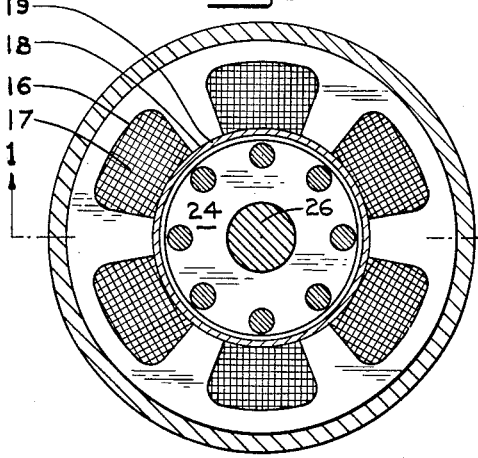
Figure 2 is a transverse section of the structure shown in Figure 1, the section being taken on the line 2—2 of Figure 1.

Referring to Figures 1 and 2, the motor 10 is enclosed in an outer pressure resistance cylindrical housing 11 of bronze or stainless steel. The stator 12 comprises a stack of stator laminations 13 assembled in a conventional manner and held in the outer shell by retaining rings 14 and 15.

The stator laminations are blanked out to provide radially extending slots 16 for the stator windings 17.

The stator laminations have a central cylindrical bore 18 within which a tubular lining sleeve 19 is fitted. The sleeve 19 is preferably made of a material having a relatively high electrical resistance to keep the eddy-current losses low. Stainless steel is preferred material for the sleeve. The wall thickness of the sleeve preferably ranges between .005 and .01 of an inch.

The ends of the cylindrical housing 11 and of the lining sleeve 19 are closed by annular end pieces 20 and 21. The outer periphery of the annular end rings are fitted into internal slots 19a and sealed to the outer shell at 22 and 23 in a water tight joint, as for example, by soldering. A rotor 24 with shaft extensions 25 and 26 is mounted within the bore of the lining sleeve 19 and journaled in bearing sleeves 35 and 36.

Figure 3:
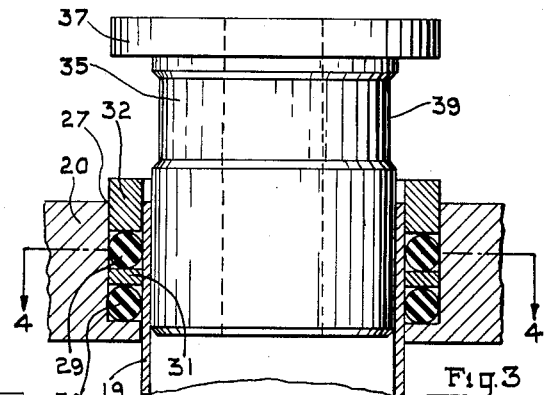
Figure 3 is an elevational view, partly in section, of a portion of Figure 1 on an enlarged scale before assembly, the section being taken on the line 3—3 of Figure 4.
Figure 4:
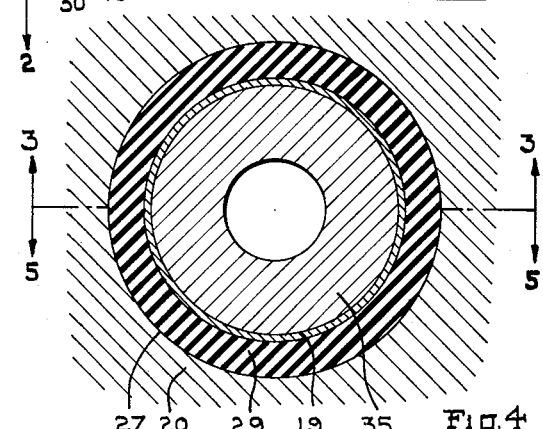
Figure 4 is a transverse section of Figure 3, the section being taken on the line 4—4 of Figure 3.
Figure 5:
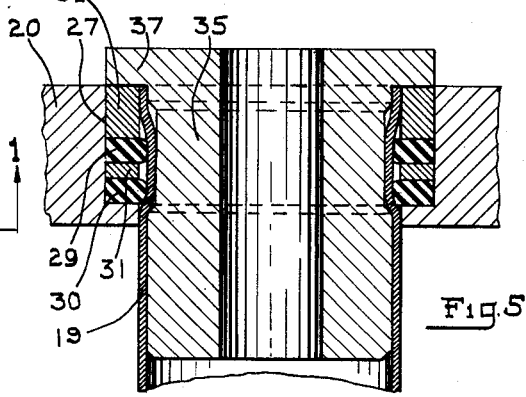
Figure 5 is a vertical section of the portion shown in Figure 3 after assembly, the section being taken on the line 5—5 of Figure 4.

Referring to Figures 3, 4 and 5, the inner periphery of the annular end pieces 20 and 21 are provided with recesses 27 and 28 to receive rings 29 and 30 and spacers 31, 32, 33 and 34, in axial relation. Rings 29 and 30 are made of a suitable resilient material such as natural or synthetic rubber, and are circular in cross-section having a diameter equal to or slightly greater than the radial width of the annular space formed by recesses 27 and 28 and the external periphery of the lining sleeve 19. Spacers 31, 32, 33 and 34 are of any suitable metal, preferred materials being stainless steel or bronze, and are rectangular in cross section.

Mounted within each end of the bore of the lining sleeve 19, and surrounding the shaft extensions 25 and 26 of the rotor 24 are cylindrical bearing sleeves 35 and 36, each having an outwardly extending shoulder 37 and 38, respectively, at its outer end. The external diameter of the main portion of the bearing sleeves provides a close fit within the bore of the lining sleeve 19, excepting for the portions 39 and 40 adjacent the shoulders 37 and 38 which are reduced in diameter. This reduction in diameter is of the order of .005 to .015 of an inch, but in Figures 3 and 5 this is exaggerated for reasons of clarity.

A cable extends into the stator space through a suitable seal or gland in end piece 20, but for reasons of simplicity this is not shown.

The assembly of the rotor and seal may proceed as follows:

The rubber rings 29 and 30 and spacer 31, 32, 33 and 34 are placed in the recesses 27 and 28 of annular end rings 20 and 21 in the order of, first a rubber ring 30 at the bottom of the recess, followed by spacer 31 or 33, then another rubber ring 29, followed by spacer 32 or 34, respectively. The rotor 24 is then placed in the bore of lining sleeve 19 and the bearing sleeves 35 and 36 are passed over the shaft extensions 25 and 26 into the bore of the sleeve 19.

Longitudinal pressure is applied to the ends of the bearing sleeves, the shoulders 37 and 38 on the bearing sleeves engaging with the outer spacers 32 and 34. The pressure causes the assemblies of rubber rings and spacers to move longitudinally inwards, compressing the rubber rings so that they expand radially. Outward expansion of the rubber rings is prevented by the walls of the recesses 27 and 28 in the annular end pieces, and any radial expansion can only, therefore, be inwards. The rubber rings compress the thin walled lining sleeve, so reducing its diameter for the length of the reduced portions 39 and 40 of the outer periphery of the bearing sleeves. The pressure is continued until the shoulders 37 and 38 on the bearing sleeves engage with the ends of the lining sleeve 19.

Thus, a watertight seal is formed between the annular end ring and the lining sleeve, and at the same time the bearing sleeve is locked in position longitudinally and angularly by friction between its outer periphery and the compressed and deformed wall of the lining sleeve.

I claim:

1. A combined watertight seal and rotor bearing mount for submersible motors comprising in combination a tubular external housing for said motor, a stator within said housing having an axial bore therethrough, a tubular lining sleeve for said bore, annular end pieces closing the space between said housing and said lining sleeve and fixed to said housing to provide a watertight joint, inner peripheral recesses on said end pieces, a plurality of alternately spaced rubber rings and metal rings adapted to be received within said peripheral recesses, and bearing sleeves for rotatably mounting a rotor within said lining sleeve, said bearing sleeves having an external diameter providing a close fit within said sleeve, a slightly reduced diameter at the portion opposite said inner peripheral recesses and end shoulders adapted to bear against and overlap the ends of said lining sleeve peripheral recesses.

2. A combined watertight seal and rotor bearing mount for submersible motors comprising in combination a cylindrical external housing for said motor, a stator within said housing having an axial bore therethrough, a tubular lining sleeve for said bore, annular end pieces closing the space between said housing and said lining sleeve and fixed to said housing to provide a watertight joint, inner peripheral recesses on said end pieces, a plurality of alternately spaced resilient rings and metal rings adapted to be received within said peripheral recesses, said resilient rings being of a diameter as large as or slightly larger than the radial width of the said peripheral recesses, and bearing sleeves for rotatably mounting a rotor within said lining sleeve, said bearing sleeves having an external diameter providing a close fit within said sleeve, a slightly reduced diameter at the portion opposite said inner peripheral recesses and end shoulders adapted to bear against and overlap the ends of said lining sleeve peripheral recesses.

No references cited.